United States Patent [19]

Brosius et al.

[11] 4,343,383

[45] Aug. 10, 1982

[54] HYDRODYNAMIC TORQUE TRANSMITTING UNIT, PARTICULARLY FOR A HYDRODYNAMIC BRAKE

[75] Inventors: Klaus Brosius; Hans Lindenthal, both of Heidenheim-Mergelstetten; Franz X. Zaunberger, Augsburg, all of Fed. Rep. of Germany

[73] Assignee: Voith Getriebe KG, Fed. Rep. of Germany

[21] Appl. No.: 208,787

[22] Filed: Nov. 20, 1980

[30] Foreign Application Priority Data

Dec. 1, 1979 [DE] Fed. Rep. of Germany ....... 2948400
Jul. 8, 1980 [DE] Fed. Rep. of Germany ....... 3025803

[51] Int. Cl.³ .............................................. F16D 57/02
[52] U.S. Cl. ...................................... 188/296; 60/343
[58] Field of Search ................... 60/343, 347; 188/290, 188/294, 296, 299; 303/11

[56] References Cited

U.S. PATENT DOCUMENTS

3,989,127 11/1976 Staudenmaier et al. ............ 188/296
4,276,970 7/1981 Herrmann et al. .................. 188/296

FOREIGN PATENT DOCUMENTS

976707 4/1964 Fed. Rep. of Germany .
1223258 8/1966 Fed. Rep. of Germany .
719470 12/1954 United Kingdom .
1380847 1/1975 United Kingdom .

*Primary Examiner*—Duane A. Reger

*Attorney, Agent, or Firm*—Ostrolenk, Faber, Gerb & Soffen

[57] ABSTRACT

The disclosure contains a hydrodynamic torque transmitting unit particularly for a hydrodynamic brake. A working chamber that is filled with working fluid contains a stator and a rotor. An inlet valve controls inlet of fluid to the working chamber. A piston connected with the inlet valve selectively closes the valve. The piston initially opens the inlet valve fully for a surge of working fluid into the working chamber. In a stage I condition, valving and pressure chambers associated with the piston returns the inlet valve to an intermediate position reducing the inflow of working fluid into the working chamber after the initial surge. In a stage II condition, the pressure chambers remain continuously pressurized for holding the inlet valve in the condition of maximum supply of working fluid to the working chamber. Various piston arrays are described in different embodiments. In the various embodiments, different piston arrangements, utilizing two pressure chambers operating selectively together or in opposition to each other, determine the various positions of the piston which moves the inlet valve. Appropriate valving and switches direct the pressure supply to the different pressure chambers at different times for moving the piston as needed to move the inlet valve. The switching is done either through a time delay arrangement and/or through a sensor directly connected with the working chamber for sensing the pressure therein.

34 Claims, 6 Drawing Figures

HYDRODYNAMIC TORQUE TRANSMITTING UNIT, PARTICULARLY FOR A HYDRODYNAMIC BRAKE

BACKGROUND OF THE INVENTION

The invention concerns a hydrodynamic torque transmitting unit, particularly a hydrodynamic brake with a toroidal working chamber filled with a working fluid, like that shown in DE-PS No. 976 707, equivalent to GB-PS No. 719,470. In this reference, hydromechanic gearing with hydrodynamic couplings is described. These have a specially designed inlet valve so that, when rapid filling of the working chamber of the coupling is required upon an engagement command, such rapid filling can be effected by first making a large filling cross-section available, and than a small one. However, the large filling cross-section opens only when a control lever is moved rapidly. Otherwise, only the small filling crosssection is opened. Rapid filling of the coupling by means of an initial filling surge requires conscious effort from outside the unit. Furthermore, the time required for the transition from the large to the small filling cross-section depends on the through-flow at a throttle point. Therefore, it differs according to the temperature and the viscosity of the working fluid flowing through the throttle point.

Another known hydrodynamic brake has an extremely sensitive response, whereby the filling of the working chamber takes place within an exceptionally short time after an engagement command. See U.S. Pat. No. 4,194,600. A similar brake is also proposed in U.S. patent application Ser. No. 104,673 filed Dec. 17, 1979. In both cases, there is a large volume inlet control valve which reacts quickly to a control command. However, this valve has only two positions, namely, a closed position and a fully open position. In hydrodynamic brakes of this kind, different levels of braking moment are established by an outlet regulating valve which is separate from the inlet control valve and is arranged in the outlet line. Problems sometimes arise in making the regulation range of the outlet regulating valve sufficiently wide. Therefore, such a brake reacts satisfactorily if moderate, or high or even extremely high braking moment is commanded. However, difficulties arise in establishing a sufficiently low minimum braking moment.

Attempts have been made to solve this problem by not opening the inlet control valve fully when a command is given to establish a low level of braking moment ("Stage I" engagement command), but instead to open this valve, for example, only half way. However, in this instance, the disadvantage arose that the elapsed time between the engagement command and the response of the brake was increased to an unacceptable extent.

SUMMARY OF THE INVENTION

The primary object of the invention is to design a hydrodynamic torque transmitting unit, and particularly a hydrodynamic brake, so that there is the greatest possible ratio between the largest and the smallest amount of torque which it transmits.

A companion object of the invention is to design such a unit which reacts very quickly, even when the transition from idling to a low level of torque is commanded.

Several solutions to this problem have been found.

The basic concept which is common to these solutions comprises providing adjustment apparatus which actuates the inlet valve in such a way that, starting from a rest state in which the inlet valve is closed, and upon a "Stage I" engagement command, the adjustment apparatus first carries out a large or long stroke in one direction to open the inlet valve fully and then the apparatus automatically carries out a small return stroke and moves the inlet valve into an intermediate open position. On the other hand, upon a "Stage II" engagement command, the adjustment apparatus carries out only the large stroke to fully open the inlet valve.

It now makes no difference whether a large amount of torque or a small amount of torque is commanded from idling (in which the adjustment apparatus is in its rest state). In both instances, the invention ensures that the inlet valve opens fully, for at least a brief period. This ensures that the hydrodynamic torque transmitting unit reacts very quickly under all circumstances. Furthermore, this also ensures that upon the "Stage I" engagement command, only a low level of filling is established in the working chamber of the hydrodynamic unit, despite the initial very rapid supply of working fluid. In other words, a highly sensitive response and a very low minimum torque, or in the case of a brake, a very small minimum braking moment, are both achieved.

In addition, the above-described disadvantage of the apparatus described in DE-PS No. 976 707, that the temporary filling surge has to be brought about by a rapid movement of a control lever, is eliminated. With the invention, the filling surge is produced automatically upon the "Stage I" engagement command. In practice, this means that if an engagement command generator (e.g. the brake lever in the case of a brake) is displaced only slightly from its rest position ("Stage I" command), then the inlet valve is operated in such a way that, in every instance, it immediately makes a large filling cross-section available, and shortly thereafter, it is set back automatically to give a smaller filling cross-section. Thus, the brief filling surge is checked automatically and a small amount of torque (or braking moment) is established. Conversely, when the engagement command generator is displaced with greater force ("Stage II" command), then in the known way a greater amount of torque is established. In this instance, a transient filling surge is not required. The full filling flow which is immediately established is maintained by keeping the inlet valve fully open. Only when "Stage I" is commanded for longer periods of time does the inlet valve remain in its partially open setting. In contrast to this, the inlet valve in the known hydrodynamic unit always has a small filling cross-section in the normal operating state (continuous operation). Thus, it is not possible to establish in it the constant high filling flow necessary for continuous operation. In the arrangement according to the invention, this requirement is fulfilled. This is essential, above all in brakes, for removing the heat which is created.

There are various embodiments of the invention.

In one embodiment, the adjustment apparatus has two adjustment components. These are preferably pistons which can be loaded by a pressure medium (similar to DE-PS No. 1 223 258). In addition, there is a switching device (or "reversing device") connected to one of the two adjustment components for returning it to the intermediate position.

In another embodiment, the adjustment apparatus comprises a double-acting cylinder, containing a single piston which is connected to a reversing device. A further reversing device can be reversed independently of the single piston.

In a third embodiment, the adjustment apparatus has two adjustment components, but there is no separate reversing device. The desired state I operation is obtained by making use of the inertial force on one of the adjustment components to initially open the valve fully and that component thereafter automatically returns to its intermediate position.

In a fourth embodiment, again, the control apparatus has two adjustment components. In addition, there is a reversing device which can be actuated independently of these.

BRIEF DESCRIPTION OF THE DRAWINGS

Other objects and features of the invention will become apparent from the various embodiments of the invention described in the following, with reference to the accompanying drawings.

DESCRIPTION OF THE PREFERRED EMBODIMENTS

Figure 1:
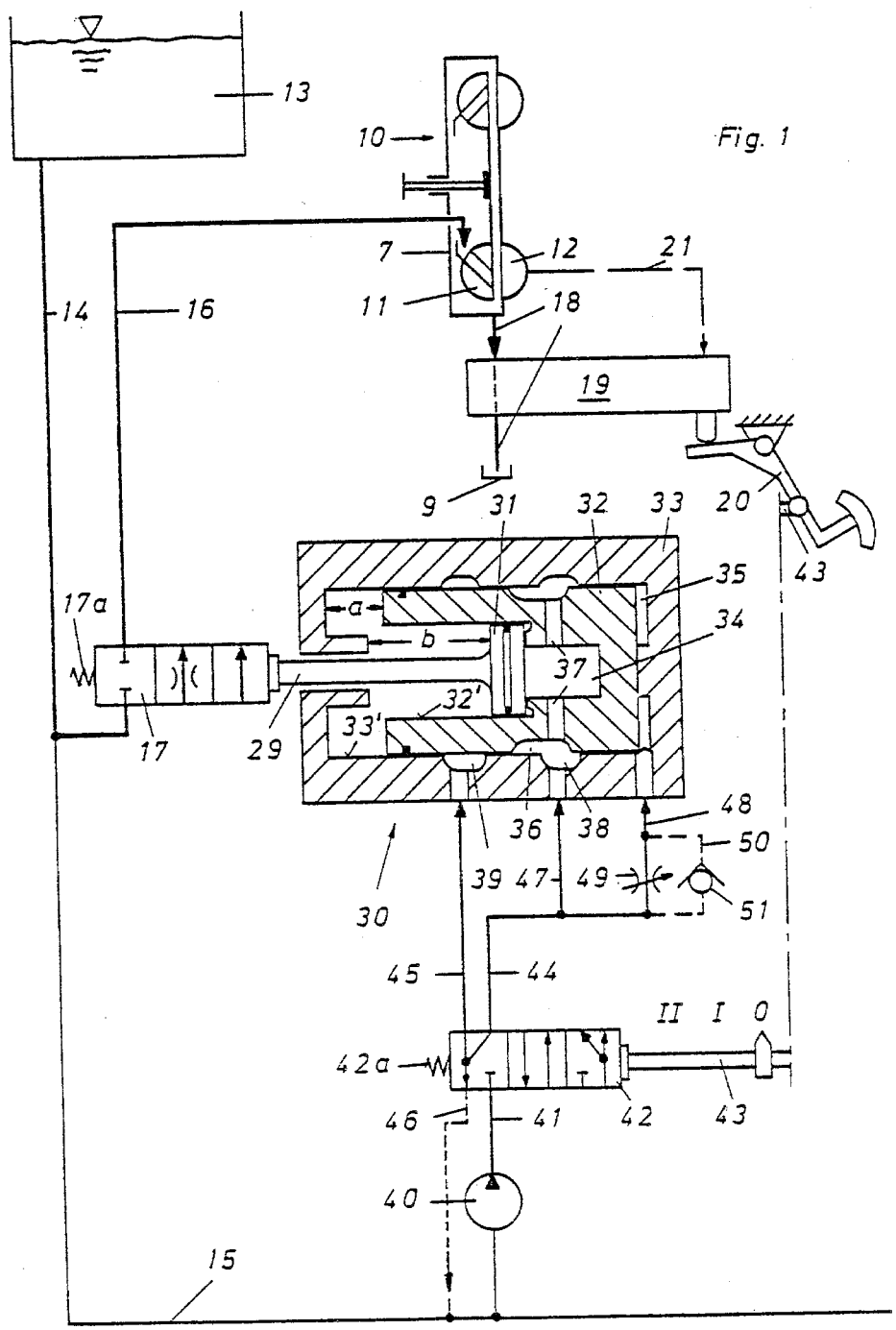
FIG. 1 is a schematic control diagram of a hydrodynamic brake according to a first embodiment of the invention.

FIG. 1 shows a hydrodynamic brake 10. It has a housing 7, a rotor 11 and a stator 12. A low pressure line 14, 15 is connected to a high-level tank 13 for working fluid. An inlet line 16, in which an inlet valve 17 is arranged, branches off from line 14, 15, leading to the brake 10. The closing part of the inlet valve 17 can be constructed as a pivoting plate, as an axially slidable ring (according to the U.S. Pat. No. 4,194,600, FIG. 1, No. 36), or in some other way. It is only important that, between the closed position and the fully open position, the inlet valve can take up at least one intermediate position in which only part of the flow cross-section is left open. In the schematic illustration of the valve 17 in FIG. 1, one intermediate position is provided.

An outlet line 18 is connected to the brake 10. An outlet regulating valve 19, preferably according to U.S. patent application Ser. No. 104,673, is located in outlet line 18. The valve 19 receives a signal from a brake pedal 20, corresponding to the amount of braking moment demanded at the time. Also, as the actual value, the valve 19 receives a signal, the size of which depends on the actual braking moment (pressure measurement line 21). The valve 19 regulates the actual value to the demanded braking moment, as that U.S. application describes. The outlet line 18 terminates in a sump 9. From there, the working fluid may be returned (not shown) via a cooler to the high-level tank 13.

Brakes generate heat during braking. In order to provide good heat removal from the brake 10 and thus to ensure that the brake reacts as quickly as possible to control commands, the lines 14, 16, 18 and the valves 17, 19 have large flow cross-sections.

The piston rod 29 is associated with the two-stage hydraulic adjustment apparatus 30. The rod 29 is connected to and acts on the valve 17. The rod 29 can take any of three different positions. For this purpose, the adjustment apparatus has a first piston 31 rigidly connected to the piston rod 29, and a separate second piston 32. The first piston 31 can carry out a large stroke b. The diameter of the first piston 31 is smaller than that of the second piston 32. The piston 31 is arranged inside the piston 32 in a cylinder bore 32' provided there. In conjunction with the bore 32', the piston 32 encloses a first pressure chamber 34. The second piston 32, which can carry out a small stroke a, encloses a second pressure chamber 35, in conjunction with the housing 33.

If there is no pressure present, a spring 17a ensures that the inlet valve 17 is closed (as far right as possible in FIG. 1). Accordingly, the pistons 31, 32 occupy their rest position, i.e. the piston 32 rests on the far (right) end of the housing 33, and the piston 31 rests on a seat in the inward (right) end of the piston 32. This state is shown in FIG. 1.

On its external casing surface, the second piston 32 has an annular groove 36, which is in communication via transverse bores 37 with the first pressure chamber 34. Two annular grooves 38 and 39 are machined in the housing bore 33' for serving to guide the piston 32. The pressure chamber 34 is connected via the transverse bores 37 and the annular groove 36 either with the annular groove 38, if the piston 32 is in the rest position, or with the annular groove 39 if the piston 32 is in the opposite position ("operating position"). The second piston 32, together with the housing 33, thus forms a switching device (or "reversing device").

A pump 40 which supplies pressure medium from the low pressure line 15 into a high pressure line 41 is provided to load the pressure chambers 34 and 35 with pressure medium. The high pressure line 41 opens out in a preliminary control valve 42 which can be displaced by pushing down the brake pedal 20, for example, through an actuating rod 43. The brake pedal 20, the actuating rod 43 and the preliminary control valve 42 together form an engagement command generator, which has three engagement stages: 0, I and II. A first pressure medium line 44 and a second pressure medium line 45 are connected to the preliminary control valve 42. In addition, a relieving line 46 leads back to the low pressure line 15 from the valve 42. As long as the brake pedal 20 is not being pressed down, a spring 42a holds the preliminary control valve in its rest position (to the right) in the engagement stage 0. In this instance, the two pressure medium lines 44 and 45 are connected to the relieving line 46 and the high pressure line 41 is closed off. When the braking pedal is pressed down slightly (engagement stage I), the second pressure medium line 45 remains connected to the relieving line 46. However, the first pressure medium line 44 is now connected to the high pressure line 41. As the brake pedal 20 is pressed down still further (engagement stage II), the second pressure medium line 45 is also connected to the high pressure line 41.

A branch line 47 leads directly from the first pressure medium line 44 into the annular groove 38. A further branch line 48, into which a throttle 49 is built, connects the first pressure medium line 44 to the second pressure chamber 35. This connection exists permanently. A non-return valve 51 is built into a relieving line 50 which by-passes the throttle 49. This valve opens when the second pressure chamber 35 is relieved in the engagement stage 0. It therefore allows the second piston 32 to return rapidly into its rest position.

When a braking command is imparted, the arrangement works as follows: In engagement stage I, pressure medium passes through the lines 44 and 47 into the first pressure chamber 34, so that the first piston 31 quickly carries out its full large stroke b and opens the inlet valve 17 fully. At the same time, pressure medium passes via the throttle 49 into the second pressure chamber 35 so that the second piston 32 moves slowly into its operating position, as compared with the speed of motion of the first piston. Movement of the second piston 32 thereby separates the first pressure chamber 34 from the first pressure medium line 44, 47, by covering over the groove 38 and connects the first pressure chamber 34 instead to the second pressure medium line 45 because groove 36 shifts to meet with groove 39. Since, in the engagement stage I, the line 45 is connected to the low pressure line 15, the pressure chamber 34 is relieved so that the first piston 31 returns into its central position, and thereby brings the inlet valve 17 into the approximately half-open position. The first piston 31 only returns to the intermediate position since it abuts the second piston 32 there, which thereby positions the piston 31. The process just described can take place within a very short space of time, so that the brake 10 receives a filling surge for a limited time when there is a "Stage I" engagement command. The duration of the filling surge and thus its intensity can be varied by adjusting the throttle 49, which varies the travel speed of the second piston 32.

A transition from engagement stage I to engagement stage II results in pressure medium additionally reaching the second pressure medium line which opens out directly in the annular groove 39. Since the piston 32 is in its operating (left hand) position, the annular groove 39 is connected to the annular groove 36 and thus to the first pressure chamber 34, all through the valve 42, so that the first piston 31 again moves into its full operating position and again opens the inlet valve 17 fully. If the brake pedal 20 is pressed down from the position 0 directly into the position II, the inlet valve 17, as described above, moves rapidly out of the closed position into the fully open position and remains there, since the pressure medium lines 44 and 45 are both immediately under pressure.

Due to the fact that in the relieved state, with the valve 17 closed the two pressure chambers 34 and 35 are connected to the low pressure line 15, which is connected to the high-level tank 13, the penetration of the air into the pressure chambers is prevented. The adjustment apparatus according to the invention can thus react particularly rapidly to an engagement command.

The arrangement of the first piston 31 (with the smaller diameter) inside a bore of the second piston 32 not only affords the advantage of a small over-all length for the adjustment apparatus 30, but, at the same time, it has the effect of making the second piston 32 a differential piston, having different surface areas facing into pressure chambers 34 and 35, without the necessity for the bore 33' in the housing having two areas with different diameters, as would otherwise be necessary. It is thus ensured by particularly simple means that when both of the pressure chambers 34 and 35 are loaded, because the surface of piston 32 facing chamber 35 is greater than the surface of piston 32 facing chamber 34, a higher force acts on the second piston 32 toward the left in FIG. 1, than toward the right.

Figure 2:
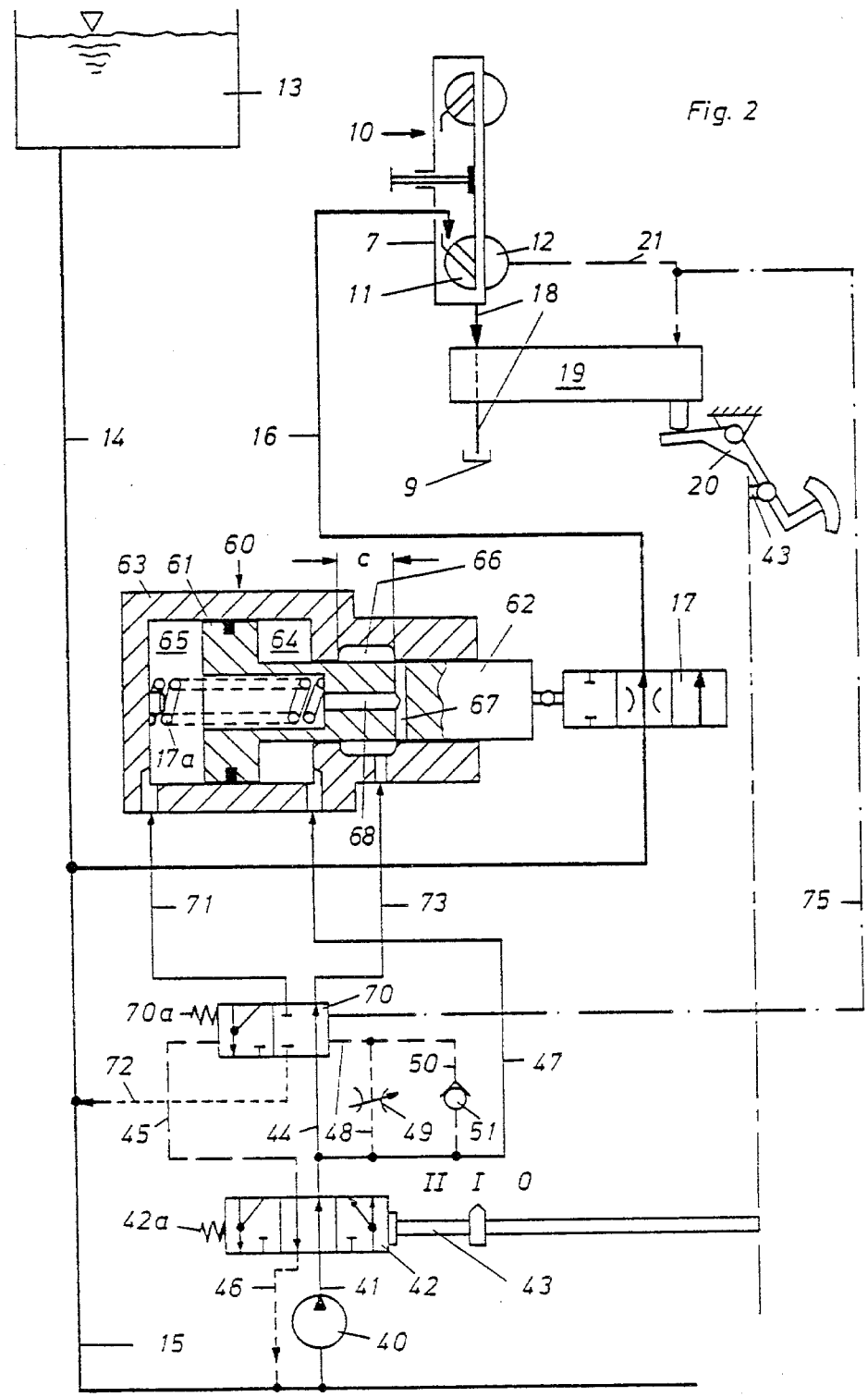
FIG. 2 is a schematic control diagram of a hydrodynamic brake according to a second embodiment of the invention.

In the embodiment of FIG. 2, many of the elements are unaltered from those in FIG. 1, namely the brake 10, with the separate parts 7, 11 and 12 and the control parts 13 to 21 and 40 to 51. The spring 17a which forces the inlet valve 17 into the closed position is now arranged inside the adjustment apparatus 60.

The apparatus 60 comprises a three-position cylinder and comprises a piston 61 with a piston rod 62 to which the inlet valve 17 is connected, a housing 63, a first pressure chamber 64 at the side of the piston 61 toward piston rod 62 and a second pressure chamber 65 located on the side of the piston 61 away from the piston rod 62. FIG. 2 shows the piston in an approximately central, intermediate flow position. The piston can be urged toward the right, into its rest position, by the spring 17a.

Inside the part of the housing 63 which surrounds the piston rod 62, an annular groove 66 is machined. Its width c amounts to approximately half the full stroke of the piston 61. A transverse bore 67 disposed in the piston rod 62 is arranged so that it does not communicate with the annular groove 66 until the piston 61, starting from its rest position, reaches the intermediate position. The transverse bore 67 is connected via a longitudinal bore 68 with the second pressure chamber 65.

There is an additional control valve 70 which can be reversed independently of movement of the piston 61. Valve 70 has a rest position and an operating position. In the rest position, into which valve 70 moves due to the force of a spring 70a, the valve connects the second pressure chamber 65 and a line 71 which opens out there to a relieving line 72, which is connected to the low pressure line 15. In addition, in its rest position it can also connect the annular chamber 66 and an adjoining connecting line 73 to the relieving line 72. In the operating position (which is the position shown in FIG. 2), on the other hand, the valve 70 connects only the first pressure medium line 44, coming from the preliminary control valve 42, to the connecting line 73. The branch line 47 connected to the line 44 leads directly into the first pressure chamber 64. The other branch line 48 in which the throttle 49 is arranged leads to that end face of the valve element 70 which faces away from the spring 70a. Finally, the second pressure medium line 45 connected to the preliminary control valve 42 leads to the other end face of the valve element 70, with which the spring 70a is associated.

When the preliminary control valve 42 is in the engagement position 0, (the position shown in FIG. 1), all the lines 44, 45, 47, 71, 73 are relieved and the valve 70 and the piston 61 are located in their rest positions. The inlet valve 17 is closed. When the preliminary control valve 42 reaches the engagement position I (the position shown in FIG. 2), which occurs with the valve 70 still in the rest position, then the pressure chamber 64 is loaded via the lines 44, 47. This causes the piston 61 to move quickly into the left-hand terminal position and thus sets the inlet valve 17 to fully open. After a specific time lag, occasioned by the throttle 49, the control valve 70 is urged to the left and reaches its operating position (the position shown in FIG. 2). Pressure medium now reaches the pressure chamber 65 via the line 73, the annular channel 66 and the bores 67 and 68. The relief connection from the line 71 to the line 72 is simultaneously interrupted. Since the area of the piston 61 loaded by the second pressure chamber 65 is larger than the area loaded by the first pressure chamber 64 the piston 61 now moves toward the right, until the connection between the annular channel 66 and the transverse bore 67 is again interrupted (the position shown in FIG. 2). The piston is now located in the intermediate position in which the inlet valve 17 is approximately half open.

When the preliminary control valve 42 is set into the engagement stage II, pressure medium immediately reaches the line 45, whereby the reversing of the control valve 70 into its rest position (to the right) is initiated. The second pressure chamber 65 is thereby relieved via the lines 71 and 72. Simultaneously, the connection between the lines 44 and 73 is interrupted terminating pressurization of chamber 65. Pressure continues to be supplied to pressure chamber 64 through lines 41, 47. The piston 61 is thereby moved again to the far left in FIG. 2, so that it again opens the inlet valve 17 fully.

Differing from the second embodiment described above, the reversing of the control valve 70 from its rest position into its operating position can also be initiated by the hydraulic pressure which builds up in the working chamber 7 of the brake when the brake 10 is operated. For this purpose, a connecting line 75 is passed from the measuring line 21 to that end face of the valve element 70 which faces away from the spring 70a. In this modified embodiment, the lines 48 and 50 with the throttle 49 and the non-return valve 51 can be omitted.

Figure 3:
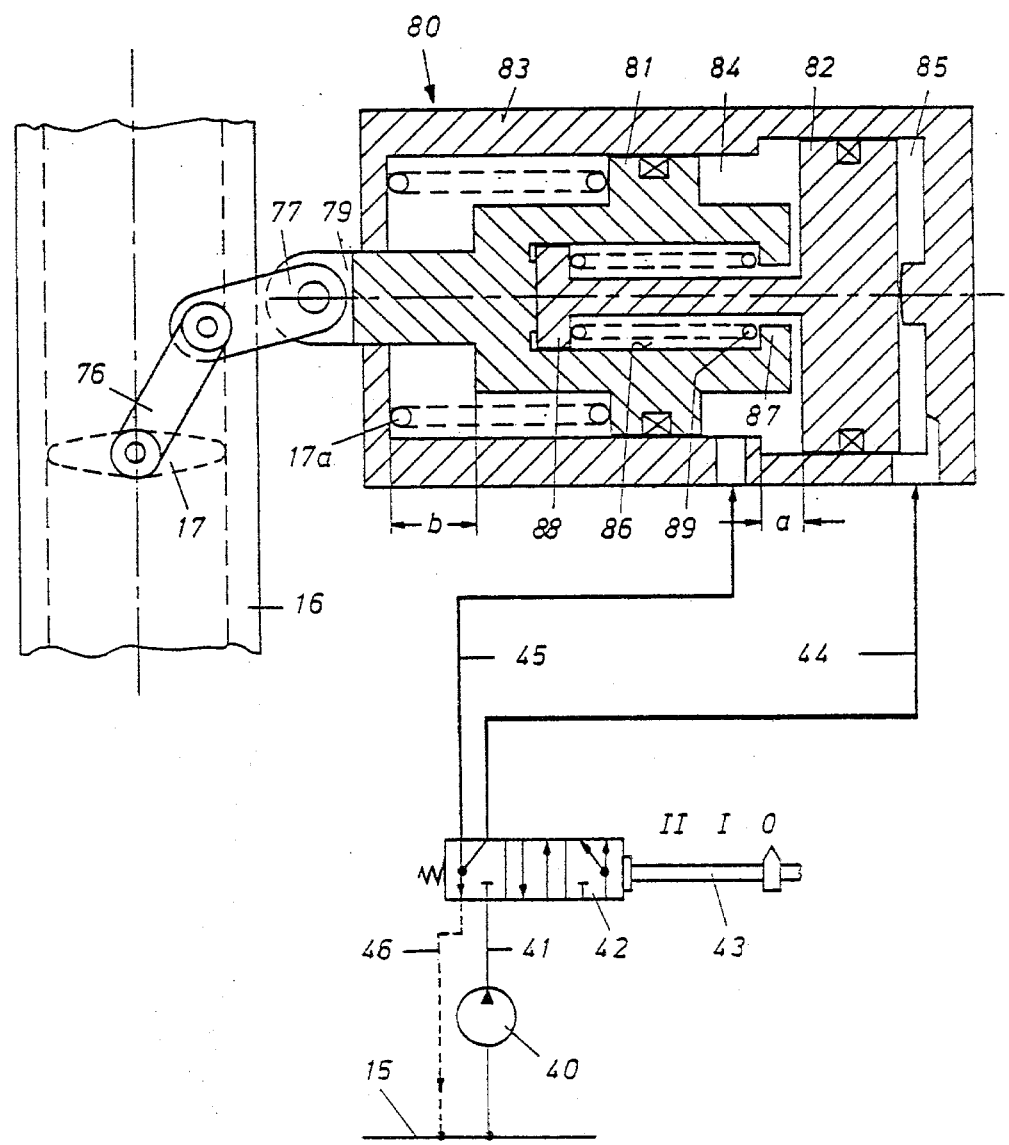
FIG. 3 shows adjustment apparatus for a hydrodynamic brake according to a third embodiment of the invention.

In FIG. 3, the hydrodynamic brake is not shown. A short length of the inlet line 16 to the working chamber is visible. In the inlet line 16, the inlet valve 17, here constructed as a pivoting plate, is located.

The pivoting plate is connected, via a lever 76 and a guide rod 77, to the piston rod 79 of the adjustment apparatus 80. The preliminary control valve 42 corresponds in its design and operation with the preliminary control valves 42 in FIGS. 1 and 2. As in FIG. 1, the adjustment apparatus 80 has a first piston 81, with which the piston rod 79 is associated and which can carry out the larger stroke b. A second piston 82 has a somewhat larger diameter than the first piston 81 and can carry out only the shorter stroke a. The first piston 81 has a central bore 86 which is open toward the second piston 82 and which terminates at a collar 87 there. A generally mushroom-shaped extension 88 on the second piston 82 projects into and sealingly engages the side walls of the bore 86. Between this extension and the collar 87, a helical compression spring 89 can be braced. By means of another helical compression spring 17a, which is braced between the housing 83 and the piston 81, the pistons 81 and 82 are held in their rest positions, at which the pivoting plate valve 17 is closed, and the piston 81 rests on the extension 88 on the second piston 82.

The first piston 81 can be loaded and shifted to the left by filling the first pressure chamber 84 with pressure medium. The second piston 82 can also be loaded and shifted to the left by filling the second pressure chamber 85 with pressure medium. The pressure medium line 45, in which pressure is present only when the preliminary control valve 42 is located in the engagement stage II, opens out in the first pressure chamber 84. On the other hand, the second pressure chamber 85 is loaded with pressure medium via the line 44 in both of the engagement positions I and II.

When the preliminary control valve 42 is brought out of the position 0 into the position I, the second piston 82 is charged and moves to the left until it abuts the shoulder at the end of its stroke a. The moving piston 82 accelerates the first piston 81 and the pivoting plate valve 17 along with the connecting parts 76 and 77, in such a way that the kinetic energy of these moving parts is so great after the stroke a by the piston 82, that the first piston 81 and the connecting parts 76 and 77 continue to move on in the same direction under the force of their inertia until the pivoting plate valve 17 is fully open. After this, the first piston and the connecting parts travel back again under the effect of the springs 17a and 89 until the first piston 81 strikes against the second piston 82, which is then located in its left-hand, operating position due to the loading of chamber 85. The pivoting plate valve 17 is thus fully opened momentarily, and is thereafter set to approximately half open.

In order to achieve the foregoing effect, it is necessary to adapt the through-put capacity of the pump 40, the cross-sections of the lines 41 and 44 and the actuating pressure to the masses, friction resistance to movement and speeds of travel of the moving parts 17, 76, 77, 79, 81 and 82. The dimensions and strengths of the springs 17a and 89 must also be chosen accordingly. The advantage of this embodiment lies in the fact that, apart from the preliminary control valve 42, no other control elements are required.

Figure 4:
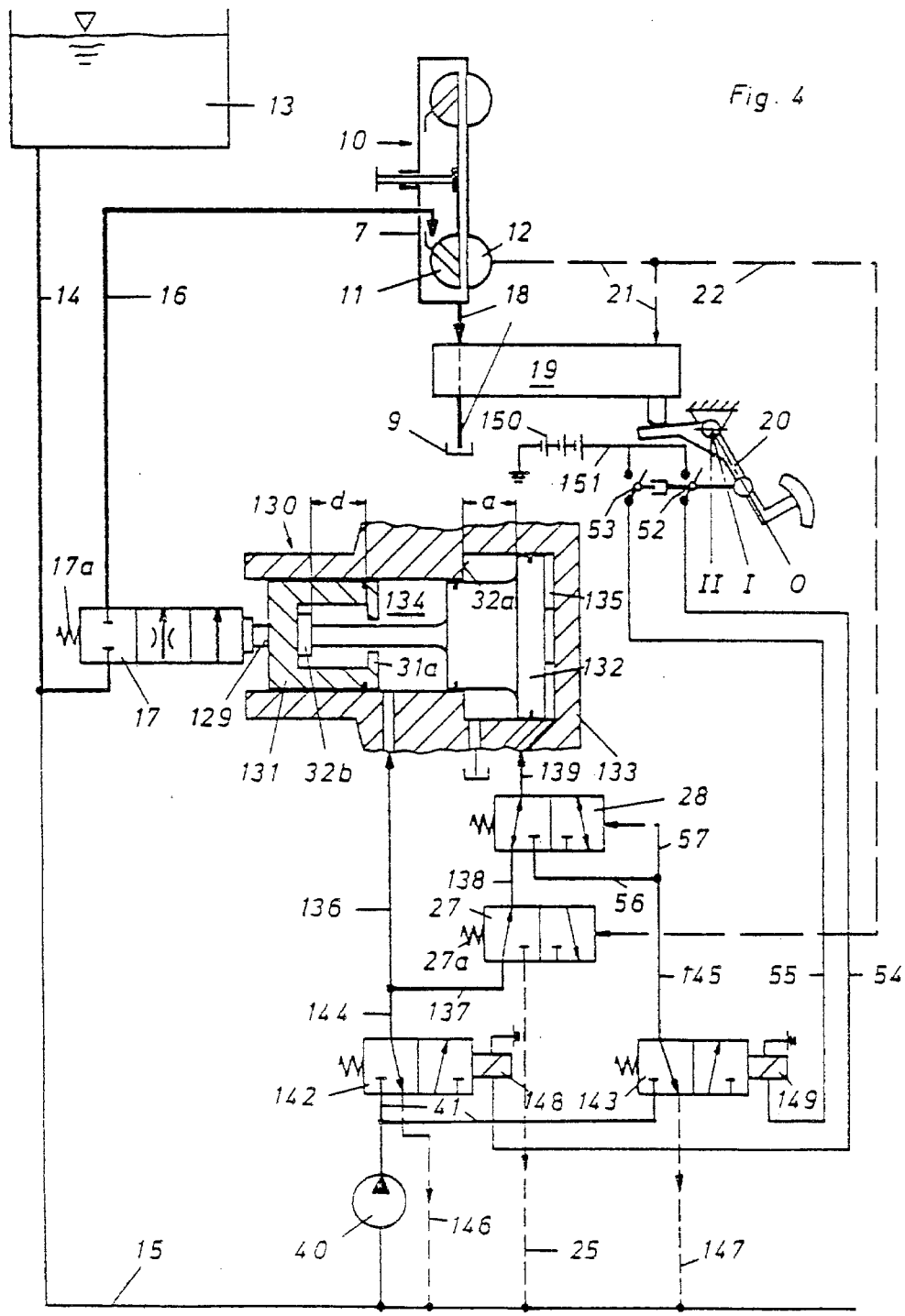
FIG. 4 is a schematic control diagram of a hydrodynamic brake according to a fourth embodiment of the invention.

The hydrodynamic brake 10 with the control parts 13 to 21 and the pump 40 with the high pressure line 41 appears again in FIG. 4, corresponding to FIG. 1. The inlet valve 17 is again actuated by the piston rod 129 of two-stage hydraulic adjustment apparatus 130. This has a first piston 131 and a second piston 132. The second piston can be displaced in the housing 133 by a partial stroke a. The two pistons 131 and 132 can also be moved counter to each other through a partial stroke d. Under the effect of the spring 17a, all of the moving parts 17, 129, 131, 132 occupy the positions shown in FIG. 4, in the rest position with valve 17 closed.

If the central pressure chamber 134 which is disposed between the two pistons 131 and 132 is loaded with pressure, the piston 131 moves toward the left over the path d and thus opens the valve 17 to approximately half way. The same effect could be obtained by loading the pressure chamber 135 disposed on the outer end surface of the second piston 132, if the two travel paths a and d are the same length. However, in the example shown, this alternative is not possible. When both of the pressure chambers 134 and 135 are loaded at the same time, the piston 131 moves toward the left by the distance a+d, so that the valve 17 is opened fully. The second piston 132 is again constructed as a differential piston, i.e. when both the pressure chambers 134 and 135 are filled with pressure medium, a higher force always acts on the piston 132 toward the left than toward the right.

To load the pressure chambers 134 and 135 with pressure medium, the pump 40 is again used. To the high pressure line 41 from pump 40, two electro-magnetically actuated preliminary control valves 142 and 143 are connected. In the rest position of control valves 142 and 143, their respective outlets 144 and 145 are connected via the line 146 or 147 respectively to the low pressure line 15. In the operating position, when the respective electromagnets 148 and 149 are excited, the outlets 144 and 145 are connected to the high pressure line 41.

The preliminary control valves 142 and 143 are controlled by the brake pedal 20. For this purpose two electric switches 52 and 53 are connected to the pedal. The arrangement is such that when the brake pedal 20 is pressed down slightly, only the switch 52 is closed ("Stage I" engagement command for a small amount of braking moment), and when the brake pedal 20 is pressed down further, both the switches 52 and 53 are closed ("Stage II" engagement command for high braking moment). Accordingly, when the brake 10 is in the engaged state, either only the electromagnet 148 is excited, or both the electromagnets 148 and 149 are excited. The arrangement also comprises a current source 150, a supply line 151 and control lines 54 and 55, respectively, for the purpose of supplying current to the electromagnets 148 and 149.

A pressure medium line 136 leads directly into the pressure chamber 134 from the outlet 144 of the preliminary control valve 142. In addition, from the outlet 144, there is a connection, via a pressure medium line 137, a first auxiliary control valve 27, a line 138, a second auxiliary control valve 28 and a line 139, to the pressure chamber 135. This connection is open throughout when the two valves 27 and 28 are located in their rest positions, which is their state shown in FIG. 4.

The first auxiliary control valve 27 can be changed over from its rest position into its operating position in which it connects the line 138 and thus the pressure chamber 135 with a relieving line 25 leading to the low pressure line 15. The change-over into this operating position is initiated in a particularly advantageous manner by hydraulic pressure which builds up in the working chamber 7 of the brake when the brake 10 is engaged, and is supplied to the valve 27 via the lines 21, 22. This pressure on the valve 27 acts counter to the force of a spring 27a. The level of the pressure on valve 27 is a measure of the braking moment produced. As soon as the pressure exceeds the spring force, and thus when a specific braking moment is reached, the auxiliary control valve 27 is changed over into its operating position.

Pressing down the brake pedal 20 from the position 0 into the position I moves the preliminary control valve 142 into its operating position. Both pressure chambers 134 and 135 are immediately loaded and the inlet valve 17 is therefore immediately opened fully. However, directly after this, namely, when a specific braking moment is reached, the auxiliary control valve 27 attains its operating position (to the left), so that the pressure chamber 135 is again relieved and the inlet valve 17 thus returns into the approximately half-opened position. This whole process takes place within a few tenths of a second. The duration of the fully-open state of the inlet valve 17 (i.e. the filling surge) is only approximately the same as the duration of the opening process. In this way, two things are achieved. First, the desired small amount of braking moment builds up in an extremely short time (it is held constant thereafter by the outlet valve 19). Secondly, a transitory surge in braking moment remains so slight that it cannot be detected.

Unlike the embodiments shown in FIGS. 1 and 2, no throttle is required. This means that the duration of the filling surge is independent of the temperature and the viscosity of the working fluid. However, it would also be possible to control the duration of the filling surge precisely by influencing the valve 27 with an electronic time control. However, it was realized that the duration of the filling surge can be controlled by much simpler means, as described above, by the hydrodynamic brake itself. The pressure which builds up in the working chamber immediately following the start of the filling process (or a signal derived therefrom) is then used to actuate the valve 27.

Due to the fact that actuation of the valve 27 is dependent on attainment of a specific braking moment, the following is achieved. The duration of the filling surge is adapted automatically to the circumstances prevailing at the time, whereby the desired braking moment is always established as quickly as possible. If, for example, the rotary speed of the brake 10 is relatively low at the time, which would result in a slow build-up of the braking moment, then a greater filling surge duration is automatically established, which acts in the direction of accelerating the build-up of braking moment. The same is the case when, for example, the supply pressure in front of the inlet valve 17 is relatively low at the time. Conversely, at particularly high rotary speeds of the rotor 11 or with particularly high pressures in the inlet line 16, the duration of the filling surge is automatically reduced, in order to obviate the danger of too strong a surge in braking moment.

In its operating position (to the left), the second auxiliary control valve 28 connects a line 56, which is connected to the outlet 145 of the preliminary control valve 143, with the line 139 and thus with the pressure chamber 135. The change-over into the operating position is again effected hydraulically, by means of a control line 57, which is also connected to the outlet 145. If the brake pedal 20 is pressed out of the position I into the position II, the magnet 149 is excited. This causes pressure to come into the lines 56 and 57 and into the pressure chamber 135. This, in turn, causes the inlet valve 17 to move from the half-open position into the fully open position. If the brake pedal 20 is pressed down from the position 0 directly into the position II, then the inlet valve 17 moves out of the closed position into the fully open position and stays there.

Figure 5:
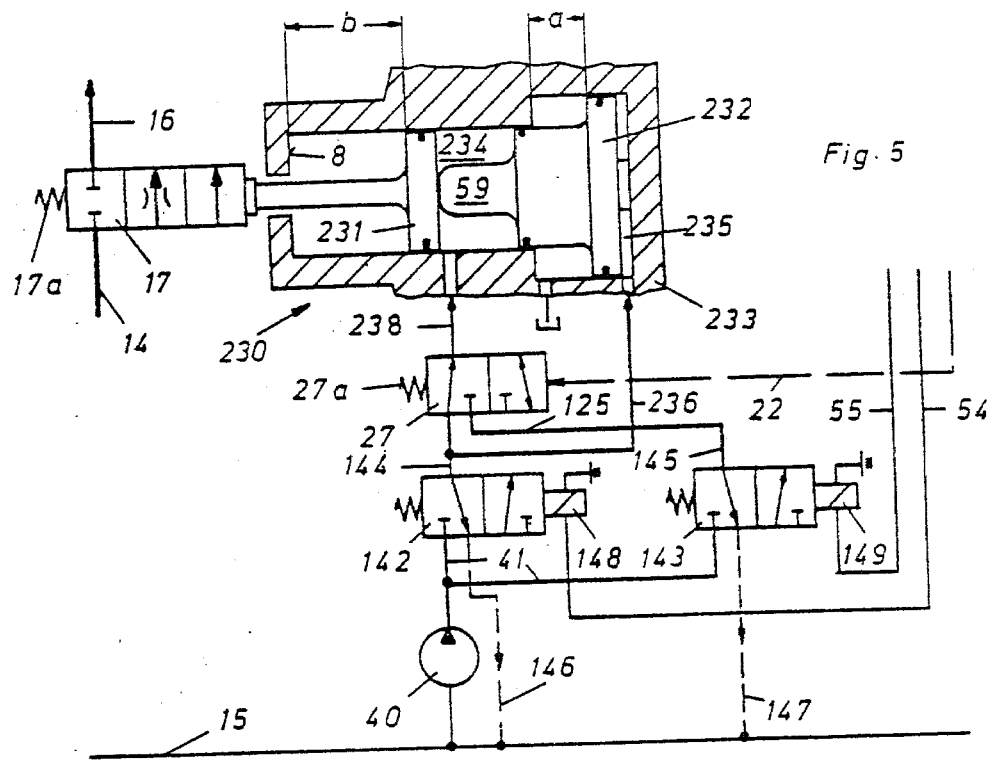
FIG. 5 is a detail from the control diagram in FIG. 4 with the design modified from that shown in FIG. 4, according to a fifth embodiment of the invention.

In FIG. 5, the components which are unchanged from FIG. 4 have the same reference symbols. Also unchanged are the parts left out in FIG. 5, such as the entire brake 10, the high-level tank 13 and the brake pedal 20 with the electrical switches 52 and 53.

In FIG. 4, the maximum stroke of the adjustment apparatus 30 is determined by two stops, namely, by the piston 132 striking on the surface 32a and by the collar 31a striking on the collar 32b. In FIG. 5, the maximum stroke b of the adjustment apparatus 230 is determined only by the collar at the end face 8 on the housing 233, against which the piston 231 strikes. This also means that the piston 231 can carry out its full stroke independently of the piston 232 when there is pressure in the chamber 234.

This somewhat simpler design of the adjustment apparatus 230 makes it necessary to now connect the outlet 144 of the preliminary control valve 142 directly via the line 236 to the pressure chamber 235, and to arrange the auxiliary control valve 27 between the outlet 144 and the adjoining line 238 which opens out in the pressure chamber 234. When "Stage I" is commanded and the electromagnet 148 is thereby excited, the effect of the arrangement shown in FIG. 5 is basically the same as in FIG. 1. Both of the pressure chambers 234 and 235 are loaded, the piston 231 presses the inlet valve 17 into the fully open position and the piston 232 also moves into the left-hand terminal position (moving over stroke a). As soon as a predetermined braking moment has been reached, the changeover of the valve 27 into the operating position is initiated by the pressure arriving via the line 21, 22, in order to relieve the pressure chamber 234 again. This has the result that the spring 17a pushes the piston 231 back toward the right until it strikes on the piston 232 which remains in its left-hand terminal position. As a result, the valve 17 is moved into its half-open position.

The second auxiliary control valve 28 which is present in FIG. 4 is omitted in FIG. 5. For this reason, in its operating position the auxiliary control valve 27 now connects the line 238 via a line 125 with the outlet 145 of the preliminary control valve 143. The above-mentioned relieving of the pressure chamber 234 thus only occurs when the preliminary control valve 143 is located in its rest position. When, on the other hand, "Stage II" is commanded and the electromagnet 149 is excited, the pressure chamber 234 is loaded with pressure via the connection 145 and the lines 125, 238, which causes the inlet valve 17 to fully open. The embodiment of the control just described, with only one auxiliary control valve 27, can also be used in conjunction with the adjustment apparatus 130 shown in FIG. 4.

Figure 6:
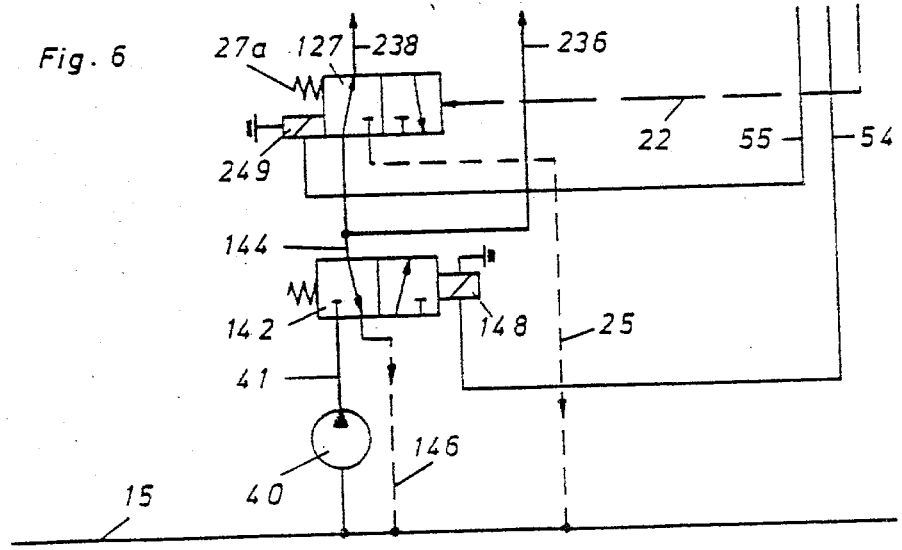
FIG. 6 is a section from the control diagram in FIG. 4 with the design modified yet again from that shown in FIG. 4, according to a sixth embodiment of the invention.

Yet another possibility for simplifying the control is shown in FIG. 6. Compared with FIG. 5, the preliminary control valve 142 associated with Stage I is present, unchanged. The auxiliary control valve 127 also corresponds basically with the valve 27 in FIG. 5. Operation when "Stage I" is commanded is also unchanged. However, the auxiliary control valve 127 additionally has an electromagnet 249 arranged on the side of the spring 27a. This can be excited via the line 55, thus by pressing the pedal down into the position II (FIG. 4). The valve 127 is thereby held in its rest position, or is moved over into its rest position if it was previously in the operating position, counter to the pressure supplied via the line 21–22. The effect is the same as when the electromagnet 149 in FIG. 5 is excited.

Differing from FIGS. 4 and 5, provision can also be made for the two preliminary control valve 142 and 143 to be changed over into their operating positions mechanically by the brake pedal 20. Furthermore, the two preliminary control valves 142 and 143 can be combined to form a three-position valve corresponding to the preliminary control valve 42 shown in FIGS. 1 to 3.

In FIG. 5, the piston 232 of the adjustment apparatus 230 has an extension 59. This serves as a spacer part between the pistons 231 and 232. It prevents the mouth of the line 238 from being covered over by one of the pistons 231 or 232. A disadvantage of this arrangement is the relatively large over-all length of the adjustment apparatus 230 it requires. This disadvantage could be avoided by the following modification (not shown). On the housing 233, concentrically to the piston 232, a core piece is attached, which penetrates the piston 232. The extension 59 is omitted, and the line 238 passes through the core piece so that it again opens out in the pressure chamber.

The embodiment in FIG. 5 could be differently modified (again not shown). The auxiliary control valve 27 is not arranged separately from the adjustment apparatus 230 but is formed by a stroke component which is arranged concentric to the pistons 231 and 232 in the adjustment apparatus 230 and which can be displaced in the same direction as the pistons by the pressure coming through the line 21, 22. Control grooves are provided on the stroke element, connecting the outlet 144 of the valve 142 with the pressure chamber 234 when the stroke component is in its rest position, and connecting the line 125 with the pressure chamber 234 after displacement of the stroke component.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A hydrodynamic torque transmitting unit, for a hydrodynamic brake or for the like purposes, the unit including:
    a toroidal working chamber containing a stator and a rotor;
    an inlet line to the working chamber for filling the chamber with working fluid; an outlet from the working chamber for removal of working fluid therefrom, such that the selective filling of the working chamber through the inlet line and the removal of working fluid therefrom through the outlet line establishes the torque to be transmitted through the working chamber;
    an inlet valve in the inlet line; the inlet valve being adjustable to a first position for establishing a large inlet flow in the inlet line and to a second position for establishing a smaller inlet flow in the inlet line;
    inlet valve adjustment apparatus connected to the inlet valve for moving the inlet valve to either of the first and second positions thereof; the adjustment apparatus including:
    first means for establishing a stage I condition, where the adjustment apparatus first moves the inlet valve to the first position thereof and automatically thereafter moves the inlet valve to the second position thereof after a predetermined time period; and
    second means for establishing a stage II condition, where the adjustment apparatus moves the inlet valve to the first position thereof and retains the inlet valve in the first position thereof.

2. The unit of claim 1, wherein the adjustment apparatus is adapted to selectively move through strokes of large and small size and the inlet valve is responsive to a stroke of the adjustment apparatus for being moved between the first and second positions thereof; the first position of the inlet valve being at the end of the large stroke of the adjustment apparatus while the second position of the inlet valve is at the end of the small stroke of the adjustment apparatus.

3. The unit of claim 2, wherein the inlet valve also has a closed position, at which it closes the inlet line; the adjustment apparatus being adapted to permit the inlet valve to move to the closed position thereof; the small and the large stroke of the adjustment apparatus being measured from the position of the adjustment apparatus at the closed position of the inlet valve; as measured from the closed position of the inlet valve, the small stroke terminates where the adjustment apparatus holds the inlet valve at the second position of the inlet valve, the second position of the inlet valve being intermediate the closed position of the inlet valve and the first position of the inlet valve.

4. The unit of claim 3, wherein the adjustment apparatus includes a first component connected to the inlet valve; the first component being movable over the large stroke of the adjustment apparatus, from a third position of the first component, which is at the closed position of the inlet valve, over and past a fourth position of the first component, which is at the second position of the inlet valve, to a fifth position of the first component, at the end of the large stroke, which is at the first position of the inlet valve.

5. The unit of claim 4, wherein the adjustment apparatus comprises pressure medium means for applying the force of a pressure medium to be selectively directed toward the first component from opposite directions thereof for moving the first component between its third, fourth and fifth positions.

6. The unit of claim 4, wherein the adjustment apparatus includes a second component which is adapted to move over the short stroke of the adjusting apparatus; the second component having a sixth position, at one end of the short stroke thereof, at which the second component permits the first component to move over the large stroke from the third to the fifth positions thereof; the second component having a seventh position, at which the first component is free to move between the fifth and fourth positions thereof while the second component, in the seventh position thereof, blocks the first component from moving to the third position thereof.

7. The unit of claim 6, wherein the first means for establishing a stage I condition comprises a reversing device, including:
first component moving means for moving the first component over the large stroke from the third to the fifth positions thereof;
second component moving means for moving the second component over the short stroke thereof from the sixth to the seventh positions thereof; and
reversal means for moving the first component back to the fourth position thereof when the second component is in the seventh position thereof.

8. The unit of claim 7, wherein the first and second components comprises first and second respective pistons; the first component moving means comprises a first pressure chamber for applying pressure to the first piston for moving the first piston from the third, through the fourth, to the fifth positions thereof; and the second component moving means comprises a second pressure chamber for applying pressure to the second piston for moving the second piston from the sixth to the seventh positions thereof.

9. The unit of claim 7, wherein the adjustment apparatus includes a time lag device for delaying the second component moving means from moving the second component from the sixth position thereof to the seventh position thereof until after the first component is at the fifth position thereof; and
the reversal means includes the second component, such that movement of the second component to the seventh position thereof initiates movement of the first component to the fourth position thereof.

10. The unit of claim 9, wherein the first and second components comprises first and second respective pistons; the first component moving means comprises a first pressure chamber for applying pressure to the first piston for moving the first piston from the third, through the fourth, to the fifth positions thereof; and the second component moving means comprises a second pressure chamber for applying pressure to the second piston for moving the second piston from the sixth to the seventh positions thereof.

11. The unit of claim 10, further comprising biasing means for urging the inlet valve from the first position to the second position thereof.

12. The unit of claim 10, wherein the reversal means comprises:
a first pressure medium line; with the second piston at the sixth position thereof, the first pressure medium line being connected with the first pressure chamber, and the first pressure medium line also being connected with the second pressure chamber through the time lag device;
the first and second means both comprising first loading means for pressurizing the first pressure medium line during both the stage I and stage II conditions;
a second pressure medium line; with the second piston at the seventh position thereof, the second piston separating the connection between the first pressure chamber and the first pressure medium line and further establishing a connection between the first pressure chamber and the second pressure medium line; and
the second means further comprising second loading means for loading the second pressure medium line during the stage II condition, and for otherwise relieving the pressure of the second pressure medium line.

13. The unit of claim 12, wherein the reversal means includes a cylinder along which the second piston moves; the second pressure chamber being defined in the cylinder; the connection between the first and second pressure medium lines and the first pressure chamber being through the cylinder along which the second piston moves, such that repositioning of the second piston along the cylinder selectively opens and closes the communication between the first and second pressure medium lines and the first pressure chamber.

14. The unit of claim 13, wherein the first piston is also located in the cylinder and the first pressure chamber is defined in the cylinder; the first pressure chamber being defined between the first and second pistons.

15. The unit of claim 14, wherein the second piston is a differential piston, having a first surface thereof in the first pressure chamber and having a second surface thereof in the second pressure chamber; the first and second surfaces respectively facing such that pressure on each moves the second piston in respective mutually opposite directions along the cylinder, and the surface area of the second surface of the second piston being greater than the surface area of the first surface thereof.

16. The unit of either of claims 10 or 12, wherein the reversal means includes a cylinder in which both of the first and second pistons are located and along which they move; the first and second pressure chambers being defined in the cylinder and the first pressure chamber being defined between the first and second pistons.

17. The unit of claim 16, wherein the second piston is a differential piston, having a first surface thereof in the first pressure chamber and having a second surface thereof in the second pressure chamber; the first and second surfaces respectively facing such that pressure on each moves the second piston in respective mutually opposite directions along the cylinder, and the surface area of the second surface of the second piston being greater than the surface of the first surface thereof.

18. The unit of claim 17, wherein the second piston is shaped to define a bore within itself, along which the first piston moves with respect to the second piston and in which the first pressure chamber is defined by the shape of the second piston.

19. The unit of claim 3, wherein the adjustment apparatus comprises a cylinder and a double acting piston movable through the cylinder; the piston being connected with the inlet valve for moving the inlet valve; the piston being movable from a third, terminal position thereof, at which the inlet valve is in the closed position, through an intermediate position thereof, at which the inlet valve is in the second position, and to a fourth, terminal position, at which the inlet valve is in the first position;

the first and second means comprising a first pressure chamber in the cylinder and place for initiating movement of the piston from the third, terminal position thereof toward the fourth, terminal position thereof upon loading of the first pressure chamber; the first means comprising a second pressure chamber in the cylinder and placed for moving the piston contrary to motion caused by the first pressure chamber upon loading of the second pressure chamber;

the adjusting apparatus further comprising reversing means for selectively loading and relieving the first and second pressure chambers for causing the piston to move between the third, terminal position, the intermediate position and the fourth, terminal position.

20. The unit of claim 19, wherein the reversing means comprises:

a pressure medium line; a connecting line for connecting to the second pressure chamber;

a first reversing device movable independently of the piston between a respective rest and operating position for connecting the second pressure chamber with pressure relief when the first reversing device is in the rest position and for connecting the pressure medium line to the connecting line when the first reversing device is in the operating position;

the first means including a second reversing device for connecting the second pressure chamber and the connecting line while the piston is in the part of its stroke between the fourth, terminal and the intermediate positions thereof;

the first means for establishing the stage I condition loading the first pressure chamber;

the second means for establishing the stage II condition also loading the first pressure chamber and causing the first reversing device to move to the rest position thereof.

21. The unit of claim 20, wherein the second reversing device comprises the piston and comprises means in the cylinder so placed as to cause the piston to block communication between the connecting line and the second pressure chamber while the piston is not between the intermediate and the fourth, terminal positions thereof.

22. The unit of either of claims 20 or 21, wherein the first means causes movement of the first reversing device from the rest position to the operating position; a time lag device being interposed for the first reversing device for delaying the movement of the first reversing device to the operating position thereof.

23. The unit of claims 20 or 21, wherein the first means comprises means for sensing the pressure in the working chamber and being connected with the first reversing device for moving it from the rest to the operating position upon build up of pressure in the working chamber.

24. The unit of claim 6, wherein the first and second components are positioned such that movement of the second component to the seventh position moves the first component from the sixth to the seventh positions thereof; moving means for moving the second component from the sixth to the seventh positions thereof;

biasing means for normally urging the first component toward the third position thereof;

the force exerted by the moving means coupled with the resistance of the second component to motion resulting in the establishment of the travel speed of the second component, coupled with the mass of the first component, the mass of the inlet valve and the strength of the biasing means, all being selected such that when the second component has moved from the sixth to the seventh positions thereof, inertia continues to drive the first component and the inlet valve to at least approximately the first position of the inlet valve, before the biasing means thereafter forces the first component to the fourth position thereof and the inlet valve to the second position thereof.

25. The unit of claim 24, further comprising additional biasing means for urging the first and second components to stay together and to move together.

26. The unit of claim 3, wherein the adjustment apparatus comprises:

a cylinder having a first piston therein connected with the inlet valve and movable over the large stroke, the first piston being movable from a third position, at which the inlet valve is in the closed position thereof, through a fourth position, at which the inlet valve is in the second position thereof to a fifth position, at which the inlet valve is in the first position thereof;

a second piston in the cylinder and movable over the short stroke between a sixth position thereof, at which the inlet valve is free to move from the closed to the first position thereof, and a seventh position thereof, which is adapted to block motion of the first piston beyond the fourth position back toward the third position; the second piston being placed for moving into engagement with the first piston during movement of the second piston between the sixth and seventh positions thereof for moving the first piston from the third to the fourth positions thereof;

a first pressure chamber in the cylinder placed for urging the first piston to move from the third, through the fourth to the fifth positions thereof;

a second pressure chamber in the cylinder placed for urging the second piston to move from the sixth to the seventh positions thereof;

the first means for establishing the stage I condition comprising a control element that first loads both of the first and second pressure chambers and then selectively relieves the first pressure chamber, enabling the return of the first piston to the fourth position thereof at which the second piston, then located at the seventh position, holds the first piston.

27. The unit of claim 3, wherein the adjustment apparatus comprises:
  a cylinder having a first piston therein connected with the inlet valve and movable over the large stroke, the first piston being movable from a third position, at which the inlet valve is in the closed position thereof, through a fourth position, at which the inlet valve is in the second position thereof to a fifth position, at which the inlet valve is in the first position thereof;
  a second piston in the cylinder and movable over the short stroke between a sixth position thereof, at which the second piston is at rest, and a seventh position thereof, which is adapted to block motion of the first piston beyond the fourth position back toward the third position; the second piston being placed for moving into engagement with the first piston during movement of the second piston between the sixth and seventh positions thereof for moving the first piston from the third to the fourth positions thereof;
  a first pressure chamber in the cylinder placed for urging the first piston to move from the third, through the fourth to the fifth positions thereof;
  a second pressure chamber in the cylinder placed for urging the second piston to move from the sixth to the seventh positions thereof; means on the second piston blocking movement of the first piston to the fifth position thereof until the second piston has shifted to the seventh position thereof;
  the first means for establishing the stage I condition comprising a control element that first loads both of the first and second pressure chambers and then selectively relieves the second pressure chamber, enabling return of the second piston to the sixth position, and the second piston moving the first piston to the fourth position thereof as the second piston returns to the sixth position.

28. The unit of claim 3, wherein the adjustment apparatus comprises:
  the part of the adjustment apparatus that is adapted to move through strokes comprises connecting means connected with the inlet valve for moving the inlet valve between the closed, the second and the first positions thereof as the adjustment apparatus moves through strokes;
  two separate pressure chambers; the connecting means communicating with the two pressure chambers such that the connecting means is adapted to move the inlet valve to the first position thereof upon pressurizing of both of the first and second pressure chambers and is adapted to move the inlet valve to the second position thereof upon relief of pressure in the second pressure chamber;
  the first means for establishing a stage I condition comprises a control element for initially loading both of the first and second pressure chambers and for selectively thereafter relieving the second pressure chamber.

29. The unit of claim 28, wherein the second means for establishing a stage II condition comprises another control element for continuously loading both of the first and second pressure chambers.

30. The unit of either of claims 27 or 28, wherein the working chamber is adapted to have the pressure therein increased as the inlet valve opens; the control element being connected with the working chamber such that in the stage I condition, the pressure in the working chamber causes the control element to relieve the second pressure chamber.

31. The unit of claim 29, further comprising a pressure source for loading the first and second pressure chambers; the control element comprising a control valve between and connecting the pressure source and the second pressure chamber for connecting the second pressure chamber and the pressure source when the control valve is in a rest position, and for connecting the second pressure chamber for relieving pressure therein when the control valve is in an operating position.

32. The unit of claim 31, further comprising a second control valve between the first control valve and the second pressure chamber; the second control valve having a rest position thereof at which it connects the second pressure chamber to the first pressure source for loading the second pressure chamber;
  the second control valve having an operating position thereof, and the second means being adapted upon establishing the stage II condition, for moving the second control valve to the operating position thereof; at the operating position thereof, the second control valve connecting another pressure medium source with the second pressure chamber.

33. The unit of claim 31, wherein the connection for relieving pressure in the second chamber comprises a relieving line, and the second means for establishing a stage II condition also loading the relieving line with pressure.

34. The unit of claim 31, wherein the control valve is held in the rest position thereof by the second means for establishing a stage II condition.

* * * * *